(12) United States Patent
Ho et al.

(10) Patent No.: US 9,785,405 B2
(45) Date of Patent: Oct. 10, 2017

(54) INCREMENT/DECREMENT APPARATUS AND METHOD

(71) Applicant: Huawei Technologies Co., Ltd., Shenzhen, CA (US)

(72) Inventors: Huong Ho, Woodlawn (CA); Michel Kafrouni, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 179 days.

(21) Appl. No.: 14/726,167

(22) Filed: May 29, 2015

(65) Prior Publication Data
US 2016/0350076 A1 Dec. 1, 2016

(51) Int. Cl.
*G06F 7/50* (2006.01)
*G06F 7/505* (2006.01)

(52) U.S. Cl.
CPC .................. *G06F 7/5055* (2013.01)

(58) Field of Classification Search
None
See application file for complete search history.

(56) References Cited

U.S. PATENT DOCUMENTS

| 5,235,537 | A | 8/1993 | McWhirter et al. | |
|---|---|---|---|---|
| 5,339,447 | A | 8/1994 | Balmer | |
| 6,591,286 | B1 * | 7/2003 | Lu | G06F 7/5055 708/672 |
| 6,665,698 | B1 | 12/2003 | Tsai et al. | |
| 6,678,711 | B1 | 1/2004 | Kalari | |
| 7,447,727 | B2 * | 11/2008 | Langsdorf | G06F 7/5055 708/672 |
| 2003/0061253 | A1 | 3/2003 | Evans | |
| 2004/0225705 | A1 | 11/2004 | Rumynin | |
| 2004/0237003 | A1 | 11/2004 | Adkisson | |
| 2005/0047527 | A1 | 3/2005 | Denk | |
| 2006/0179345 | A1 | 8/2006 | Subbarao | |
| 2012/0239719 | A1 | 9/2012 | Rigge | |

FOREIGN PATENT DOCUMENTS

| CN | 1591824 A | 3/2005 |
|---|---|---|
| CN | 102707931 A | 10/2012 |
| JP | 2001036348 A | 2/2001 |

OTHER PUBLICATIONS

Dimitrakopoulous, G., "Low-Power Leading-Zero Counting and Anticipation Logic for High-Speed Floating Point Units," IEEE Transactions on Very Large Scale Integration (VLSI) Systems, vol. 16, No. 7, Jul. 2008, pp. 837-850.
Grushin, A. I., et al., "Fast Result Normalization in FP Adder," Electrical and Electronics Engineers in Israel, Dec. 2008, pp. 152-156.

\* cited by examiner

*Primary Examiner* — Michael D Yaary
(74) *Attorney, Agent, or Firm* — Slater Matsil, LLP

(57) ABSTRACT

A method comprises receiving an N-bit unsigned number and a control signal, in response to the control signal indicating an increment operation, increasing the N-bit unsigned number by 1 through an increment/decrement apparatus having (2m+3) levels of 2-input logic gates, wherein m is equal to $\log_2^{(N)}$ and in response to the control signal indicating a decrement operation, decreasing the N-bit unsigned number by 1 through the increment/decrement apparatus.

20 Claims, 7 Drawing Sheets

INCREMENT/DECREMENT APPARATUS AND METHOD

TECHNICAL FIELD

The present invention relates to central processing unit and digital signal processor designs, and, in particular embodiments, to an increment/decrement apparatus and method.

BACKGROUND

Floating-point arithmetic operations are widely used in digital applications such as Central Process Unit (CPU), Digital Signal Processor (DSP) and/or the like. A real number can be written in floating-point representation. For example, a real number 'a' can be expressed by the following equation:

$$a = (-1)^S \cdot M_a \cdot b^q \quad (1)$$

where S is the sign of the real number 'a'; Ma is the mantissa of the real number 'a'; b is the base (2 or 10) of the real number and q is the exponent of the real number 'a'.

Floating-point arithmetic operations such as an increment/decrement process may be carried out by a variety of logic circuits. For example, an increment process may be carried out based on an adder having a first input configured to receive a number to be increased by 1 and a second input configured to receive a binary number, which is set to 1. On the other hand, for a decrement process, the data of the first input is added to the second input whose value is set to −1. The two n-bit binary numbers are processed by the adder to generate an (n+1)-bit output. In general, the computation delay of the increment/decrement operation based upon an adder (e.g., a ripple adder) is (n−1) levels of logic gates.

SUMMARY OF THE INVENTION

These and other problems are generally solved or circumvented, and technical advantages are generally achieved, by preferred embodiments of the present invention which provide an apparatus and method for applying an increment/decrement operation to a binary number.

In accordance with an embodiment, an apparatus comprises an input block configured to receive an N-bit unsigned number, wherein the input block comprises N propagate and generate cells, a plurality of calculation cells arranged in rows and columns, wherein the number of the columns is equal to N and the number of the rows is equal to $\log_2^{(N)}$, wherein each row has an index ri, and wherein a variable d is equal to $2^{ri}$, and wherein each calculation cell has two groups of inputs connected to two cells in a preceding row, and wherein a first group of inputs are connected to outputs of a first calculation cell in the preceding row and vertically aligned with the calculation cell and a second group of inputs are connected to outputs of a second calculation cell that is d cells away from the first calculation cell and an output block comprising a plurality of XOR gates.

In accordance with another embodiment, a system comprises an input block configured to receive an N-bit unsigned number and a control signal, wherein the input block comprises N propagate and generate cells, a plurality of calculation cells arranged in rows and columns and coupled to the input block, wherein the calculation cells are configured to perform an increment/decrement operation, the increment/decrement operation is applied to the N-bit unsigned number through (2m+3) levels of 2-input logic gates, wherein m is equal to $\log_2^{(N)}$ and an output block comprising a plurality of XOR gates coupled to a last row of the plurality of calculation cells.

In accordance with yet another embodiment, a method comprises receiving an N-bit unsigned number and a control signal, in response to the control signal indicating an increment operation, increasing the N-bit unsigned number by 1 through an increment/decrement apparatus having (2m+3) levels of 2-input logic gates, wherein m is equal to $\log_2^{(N)}$ and in response to the control signal indicating a decrement operation, decreasing the N-bit unsigned number by 1 through the increment/decrement apparatus.

An advantage of a preferred embodiment of the present invention is to achieve a fast increment/decrement process of a binary number through an increment/decrement apparatus having (2·log₂(N)+3) levels of logic gates (e.g., 2-input NAND gates). Such an apparatus helps to reduce the logic gate delay, thereby improving the efficiency of floating-point arithmetic operations.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely an increment/decrement apparatus in digital circuit applications. The invention may also be applied, however, to a variety of floating-point arithmetic operations in applications such as Central Processing Unit (CPU), Digital Signal Processing (DSP) and/or the like. Hereinafter, various embodiments will be explained in detail with reference to the accompanying drawings.

Figure 1:
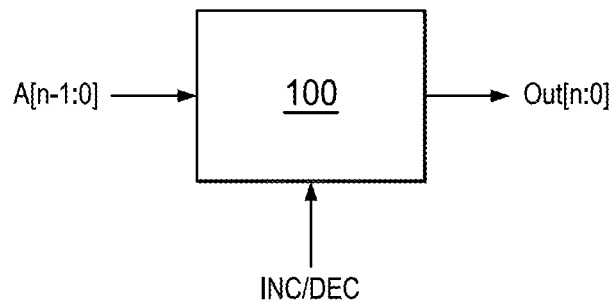
FIG. 1 illustrates a block diagram an increment/decrement apparatus in accordance with various embodiments of the present disclosure.

FIG. 1 illustrates a block diagram an increment/decrement apparatus in accordance with various embodiments of the present disclosure. The increment/decrement apparatus 100 has two inputs and an output as shown in FIG. 1. The first input A is configured to receive an N-bit unsigned number in binary format. In some embodiments, the N-bit unsigned number ranges from bit 0 to bit (n−1). The binary representation of the N-bit unsigned number is A[n−1:0] as shown in FIG. 1. In some embodiments, the N-bit unsigned number A is a number to be increased by 1 or decreased by 1 depending on a control signal INC/DEC received at a second input of the increment/decrement apparatus 100.

The second input of the increment/decrement apparatus 100 is configured to receive the control signal INC/DEC indicating increment and decrement operations. More particularly, INC/DEC is set to 1 in binary notation when an increment operation is performed on the N-bit unsigned number A. On the other hand, INC/DEC is set to 0 in binary notation when a decrement operation is performed on the N-bit unsigned number A.

The output of the increment/decrement apparatus 100 carries out the increment or decrement operation of the N-bit unsigned number A. The output of the increment/decrement apparatus 100 generates a number in binary format. The output OUT has (n+1) bits ranging from bit 0 to bit n.

The increment/decrement apparatus 100 comprises an input block, an output block and a plurality of calculation cells arranged in rows and columns. The number of columns is equal to N. The number of rows is equal to m where m is equal to $\log_2(N)$. The longest delay path of the increment/decrement apparatus 100 is equal to (2·m+3) levels of logic gates (e.g., 2-input NAND gates). The detailed operation principles and schematic diagrams of the increment/decrement apparatus 100 will be described below in detail with respect to FIGS. 2-11.

Figure 2:
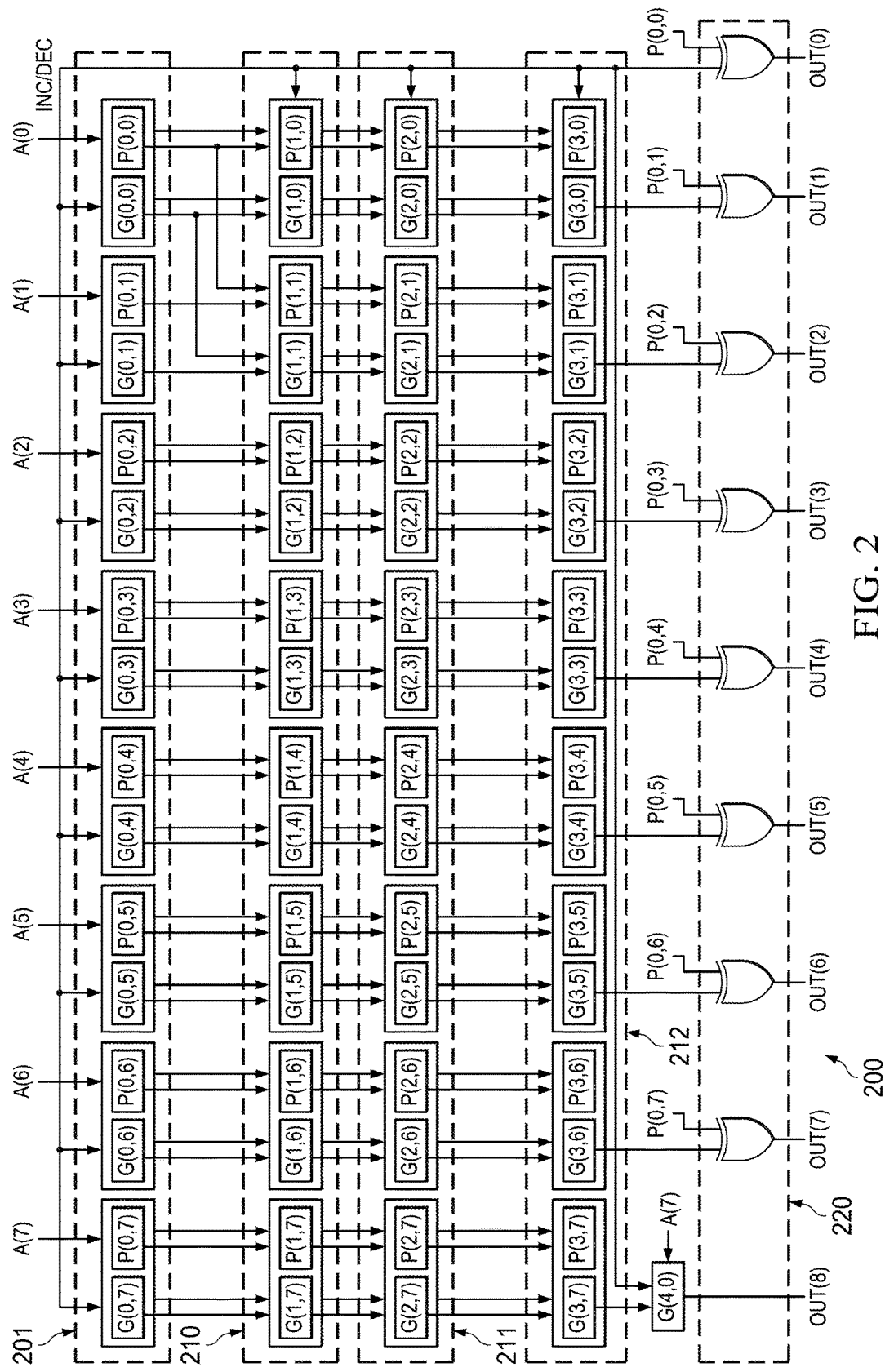
FIG. 2 illustrates a block diagram an 8-bit increment/decrement apparatus in accordance with various embodiments of the present disclosure.

FIG. 2 illustrates a block diagram an 8-bit increment/decrement apparatus in accordance with various embodiments of the present disclosure. The 8-bit increment/decrement apparatus 200 receives one 8-bit unsigned number (e.g., A shown in FIG. 2) and generates a 9-bit output number OUT ranging from bit 0 to bit 8. The 8-bit increment/decrement apparatus 200 includes four rows, namely row 201, row 210, row 211 and row 212. The structure of the cells in row 201 is different from the structure of the cells in rows 210, 211 and 212. Row 201 is alternatively referred to as the input block of the 8-bit increment/decrement apparatus 200. The cells of rows 210, 211 and 212 share a same structure. The cells of rows 210, 211 and 212 are alternatively referred to as the calculation cells throughout the description. As shown in FIG. 2, these three rows include a plurality of cells. These cells are arranged in columns and rows. Each bit of the 8-bit unsigned number is fed into one column. As such, the 8-bit increment/decrement apparatus 200 includes eight columns as shown in FIG. 2.

Row 201 includes eight Propagate and Generate cells. Each cell includes a Propagate output and a Generate output. Each cell of row 201 is configured to receive a bit of the 8-bit unsigned number A and the control signal INC/DEC. For example, the fourth Propagate and Generate cell is configured to receive bit A(3) and the control signal INC/DEC. The bit A(3) and the control signal INC/DEC are processed by the logic gates of the fourth Propagate and Generate cell of row 201. As a result, a Propagate output P(0,3) and a Generate output G(0,3) are generated at the outputs of the fourth Propagate and Generate cell of row 201. The detailed schematic diagram of the Propagate and Generate cell of row 201 will be described below with respect to FIG. 3.

Row 210 includes eight Propagate and Generate cells, each of which is vertically aligned with a corresponding Propagate and Generate cell in row 201. The corresponding Propagate and Generate cell in row 201 is referred to as the preceding cell because it is placed above the Propagate and Generate cell in row 210 and vertically aligned with the Propagate and Generate cell in row 210. For example, the fourth cell (cell G(0,3) and P(0,3)) of row 201 is the preceding cell of the fourth cell (cell G(1,3) and P(1,3)) of row 210.

Each cell of row 210 includes a Propagate output and a Generate output. The schematic diagram of the Propagate and Generate cells of row 210 will be described below in detail with respect to FIG. 4.

Each cell of row 210 has five inputs. Among these five inputs, four inputs are connected to the outputs of the cells of row 201 and one input is connected to the control signal INC/DEC. A first input and a second input of a cell (e.g., cell including G(1,1) and P(1,1)) are connected to the outputs of the preceding cell (e.g., cell including G(0,1) and P(0,1)). A third input and a fourth input of the cell (e.g., cell including G(1,1) and P(1,1)) are connected to the outputs of a cell immediately next to the preceding cell. In other words, the third input and the fourth input of the cell are connected to the outputs of a cell (e.g., cell including G(0,0) and P(0,0)) that is one cell away from the preceding cell.

In sum, the inputs of each cell of row 210 are connected to the outputs of its preceding cell in row 201 and the outputs of a first cell in row 201 having d positions away from the preceding cell. In some embodiments, d is equal to $2^{ri}$, where ri is the row index of row 210. Row 210 has a row index of 0 and d is equal to 1. As a result, in row 210, each cell has inputs connected to its preceding cell and a first cell having one cell away from the preceding cell. According to this connection principle, some inputs of the cells of row 210 are connected to cells that do not exist in row 201. These inputs of the cells of row 210 may be set to 0.

Row 211 includes eight Propagate and Generate cells, each of which is vertically aligned with a corresponding cell in row 210 as shown in FIG. 2. The corresponding cell in row 210 is referred to as the preceding cell because it is placed above the cell in row 211 and vertically aligned with the cell in row 211. The cells of row 211 have the same schematic diagram as the cells of row 210.

Row 211 has a row index of 1. As a result, d of row 211 is equal to 2. Each cell of row 211 has five inputs. A first input and a second input of a cell (e.g., cell including $G(2,4)$ and $P(2,4)$) are connected to the output of the preceding cell (e.g., cell including $G(1,4)$ and $P(1,4)$) in row 210. A third input and a fourth input of the cell (e.g., cell including $G(2,4)$ and $P(2,4)$) are connected to the outputs of a cell (e.g., cell including $G(1,2)$ and $P(1,2)$) that is two cells (d=2) away from the preceding cell (e.g., cell including $G(1,4)$ and $P(1,4)$). Some inputs of the cells in row 211 are connected to cells that do not exist. These inputs are set to 0.

Row 212 includes eight Propagate and Generate cells, each of which is vertically aligned with a corresponding cell in row 211. The corresponding cell in row 211 is referred to as the preceding cell. The cells of row 212 have the same schematic diagram as the cells of row 210.

Row 212 has a row index of 2. As a result, d of row 212 is equal to 4. As shown in FIG. 2, each cell of row 212 has five inputs. A first input and a second input of a cell (e.g., cell including $G(3,4)$ and $P(3,4)$) are connected to the outputs of the preceding cell (e.g., cell including $G(2,4)$ and $P(2,4)$) in row 211. A third input and a fourth input of the cell (e.g., cell including $G(3,4)$ and $P(3,4)$) are connected to the outputs of a cell (e.g., cell including $G(2,0)$ and $P(2,0)$) that is four cells (d=4) away from the preceding cell (e.g., cell including $G(2,4)$ and $P(2,4)$). Some inputs of the cells in row 212 are connected to cells that do not exist. These inputs are set to 0.

The 8-bit increment/decrement apparatus 200 further comprises an output block 220 and a most significant bit (MSB) unit $G(4,0)$. The output block 220 comprises eight exclusive OR (XOR) gates. As shown in FIG. 2, a first XOR gate has a first input connected to the control signal INC/DEC and a second input connected to $P(0,0)$. The other XOR gates of the output block 220 have a first input connected to an output of a cell that is one cell away from the preceding cell in row 212 and a second input connected to a corresponding Propagate output in row 201. For example, the second XOR gate has a first input connected to $G(3,0)$ and a second input connected to $P(0,1)$ as shown in FIG. 2. The detailed schematic diagrams of the output block 220 will be described below with respect to FIG. 11.

The MSB unit $G(4,0)$ has three inputs as shown in FIG. 2. A first input of the MSB unit $G(4,0)$ is connected to bit $A(7)$. A second input of the MSB unit $G(4,0)$ is connected to the Generate output $G(3,7)$. A third input of the MSB unit $G(4,0)$ is connected to the control signal INC/DEC. The detailed schematic diagrams of the MSB unit $G(4,0)$ will be described below with respect to FIG. 5.

It should be noted that FIG. 2 illustrates only eight cells in each row that may include hundreds of such cells. The number of cells in each row illustrated herein is limited solely for the purpose of clearly illustrating the inventive aspects of the various embodiments. The various embodiment of the present application are not limited to any specific number of cells in each row.

Furthermore, the diagram shown in FIG. 2 is merely an example, which should not unduly limit the scope of the claims. One of ordinary skill in the art would recognize many variations, alternatives, and modifications. For example, the 8-bit increment/decrement apparatus 200 illustrated in FIG. 2 is simply one embodiment and that other configurations for an increment/decrement apparatus, including an arithmetic operation with a different number of bits, can be employed.

Figure 3:
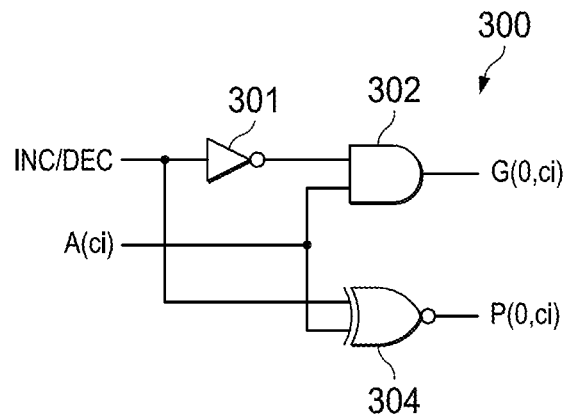
FIG. 3 illustrates a schematic diagram of the Propagate and Generate cells of the first row in accordance with various embodiments of the present disclosure.

FIG. 3 illustrates a schematic diagram of the Propagate and Generate cells of the first row (row 201) in accordance with various embodiments of the present disclosure. The Propagate and Generate cell 300 includes a NOT gate 301, an AND gate 302 and a XNOR gate 304. The Propagate and Generate cell 300 has a first input configured to receive $A(ci)$ where ci represents a bit of the unsigned number A and a second input configured to receive INC/DEC. Both $A(ci)$ and INC/DEC are fed into the XNOR gate 304. The output of the XNOR gate 304 is the Propagate output $P(0,ci)$. A first input of the AND gate 302 is coupled to INC/DEC through the NOT gate 301. A second input of the AND gate 302 is connected to $A(ci)$. The output of the AND gate 302 is the Generate output $G(0,ci)$.

Figure 4:
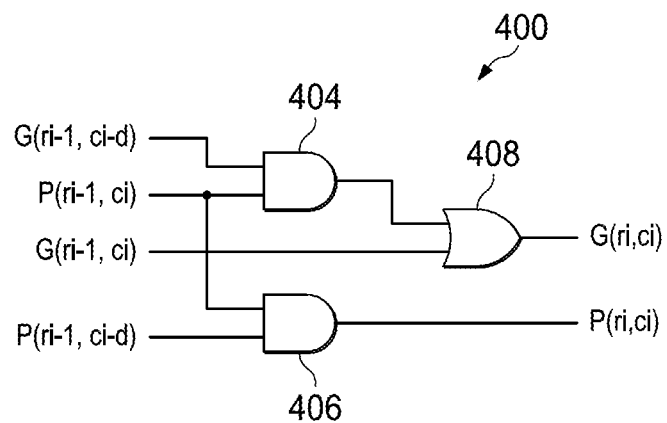
FIG. 4 illustrates a schematic diagram of the Propagate and Generate cells of the other rows in accordance with various embodiments of the present disclosure.

FIG. 4 illustrates a schematic diagram of the Propagate and Generate cells of the other rows (rows 210-212) in accordance with various embodiments of the present disclosure. The Propagate and Generate cell 400 include a first AND gate 404, a second AND gate 406 and an OR gate 408.

The Propagate and Generate cell 400 has four inputs. A first input is configured to receive $G(ri-1, ci-d)$ where ri represents the index of the row where the Propagate and Generate cell 400 is located; ci represents the index of the column where the Propagate and Generate cell 400 is located; d is a variable. In some embodiments, d is given by the following equation:

$$d=2^{ri} \qquad (2)$$

As shown in FIG. 4, a second input of the Propagate and Generate cell 400 is configured to receive $P(ri-1,ci)$. A third input of the Propagate and Generate cell 400 is configured to receive $G(ri-1,ci)$. A fourth input of the Propagate and Generate cell 400 is configured to receive $P(ri-1,ci-d)$.

As shown in FIG. 4, the first AND gate 404 has two inputs. A first input of the first AND gate 404 is configured to receive $G(ri-1,ci-d)$. The second input of the first AND gate 404 is connected to a first input of the second AND gate 406. A second input of the second AND gate 406 is configured to receive $P(ri-1,ci-d)$. The output of the second AND gate is the Propagate output $P(ri,ci)$.

The first input of the OR gate 408 is connected to the output of the first AND gate 404. The second input of the OR gate 408 is configured to receive $G(ri-1,ci)$. The output of the OR gate 408 is the Generate output $G(ri,ci)$.

Referring back to FIG. 2, the 8-bit increment/decrement apparatus 200 includes three rows of Propagate and Generate cells. For an N-bit increment/decrement apparatus, there are m rows of Propagate and Generate cells where m is equal to $\log_2(N)$. As shown in FIG. 4, in each Propagate and Generate cell, an input signal is processed by two levels of logic gates. As a result, in the N-bit increment/decrement apparatus, the input signals may be processed by 2m levels of logic gates. In addition, the input block of the N-bit increment/decrement apparatus is formed by the logic gates shown in FIG. 3, which has three logic gates. As a result, the total computation delay of the N-bit increment/decrement apparatus is equal to (2m+3) levels of logic gates (e.g., 2-input NAND gates).

Figure 5:
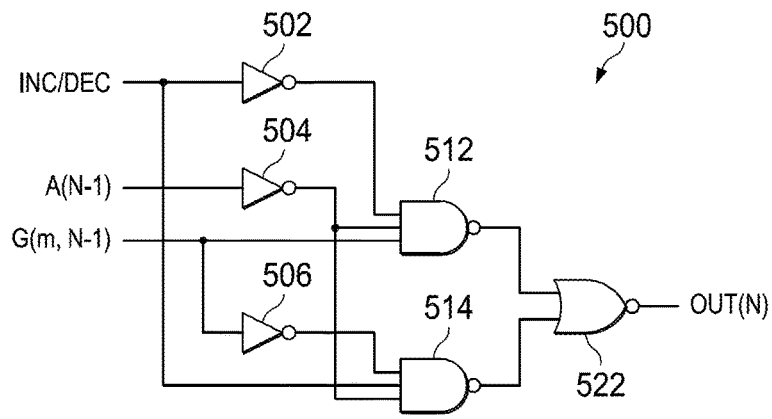
FIG. 5 illustrates a schematic diagram of the most significant bit (MSB) unit of the 8-bit increment/decrement apparatus shown in FIG. 2 in accordance with various embodiments of the present disclosure.

FIG. 5 illustrates a schematic diagram of the MSB unit of the 8-bit increment/decrement apparatus shown in FIG. 2 in accordance with various embodiments of the present disclosure. The MSB unit has three input ports. The first input port of the MSB unit is configured to receive the control signal INC/DEC. The second input port of the MSB unit is configured to receive a high-order bit of the N-bit unsigned number (bit A(N−1)). The third input port of the MSB unit is configured to receive a Generate output of a leftmost cell of a last row of the plurality of Propagate and Generate cells (G(m,N−1)).

The MSB unit includes a first NOT gate 502, a second NOT gate 504, a third NOT gate 506, a first NAND gate 512, a second NAND gate 514 and a third NAND gate 522. As shown in FIG. 5, the third NAND gate 522 has a first input connected to an output of the first NAND gate 512 and a second input connected to an output of the second NAND gate 514.

As shown in FIG. 5, the first NAND gate 512 has a first input coupled to the first input port through the first NOT gate 502, a second input coupled to the second input port through the second NOT gate 504 and a third input coupled to the third input port. The second NAND gate 514 has a first input coupled to the third input port through the third NOT gate 506, a second input coupled to the first input port and a third input connected to the second input of the first NAND gate 512.

Figure 6:
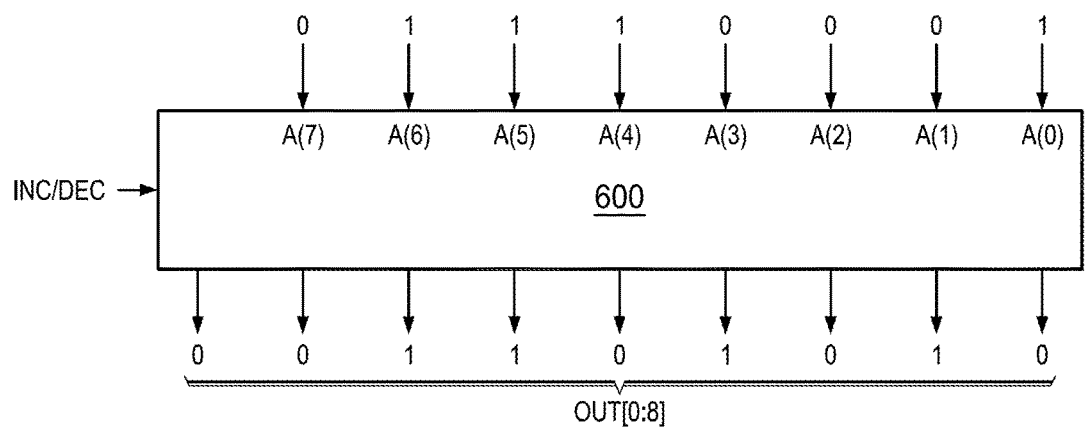
FIG. 6 illustrates an increment operation in accordance with various embodiments of the present disclosure.

FIG. 6 illustrates an increment operation in accordance with various embodiments of the present disclosure. An 8-bit unsigned number A is fed into an 8-bit increment/decrement apparatus 600 similar to that shown in FIG. 2. As shown in FIG. 6, the unsigned number A has 8 bits ranging from bit 0 to bit 7. A control signal INC/DEC is fed into the 8-bit increment/decrement apparatus 600. In some embodiments, INC/DEC is set to 1 in binary notation when an increment operation is performed on the unsigned number A. On the other hand, INC/DEC is set to 0 in binary notation when a decrement operation is performed on the unsigned number A.

In the increment operation, the unsigned number A is equal to 01110001 in binary format. In response to the control signal INC/DEC indicating that an increment operation is carried out by the 8-bit increment/decrement apparatus 600, the output of the 8-bit increment/decrement apparatus 600 generates 001101010 in binary format as shown in FIG. 6.

Figure 7:
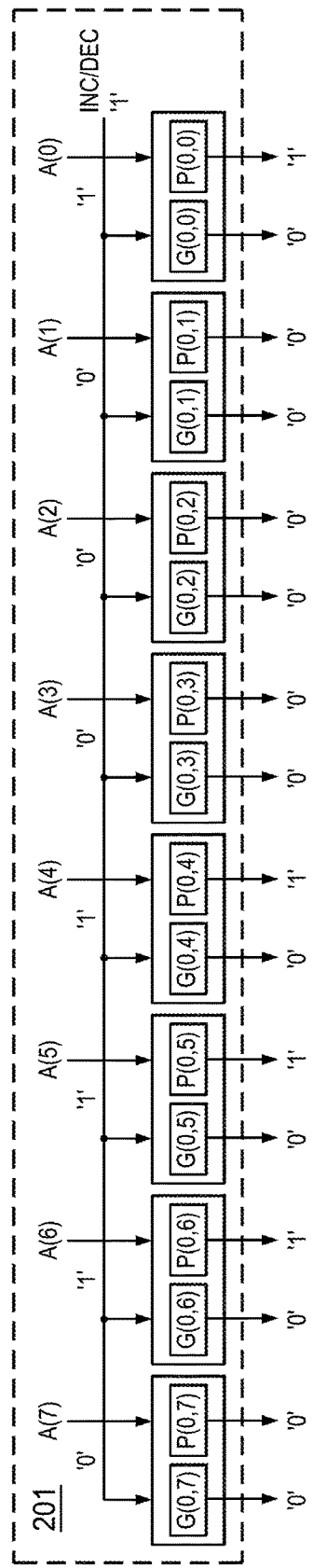
FIG. 7 illustrates a schematic diagram of a first row of the 8-bit increment/decrement apparatus shown in FIG. 6 in accordance with various embodiments of the present disclosure.

FIG. 7 illustrates a schematic diagram of a first row of the 8-bit increment/decrement apparatus shown in FIG. 6 in accordance with various embodiments of the present disclosure. Row 201 includes eight Propagate and Generate cells, each of which comprises two inputs and two outputs. A first input of each Propagate and Generate cell is configured to receive a bit of the unsigned 8-bit number A. A second input of each Propagate and Generate cell is configured to receive the control signal INC/DEC.

Each bit of the unsigned 8-bit number A is processed by the NOT gate 301, the AND gate 302 and XNOR gate 304 shown in FIG. 3. The Propagate output of the first row is 01110001 in binary format as shown in FIG. 7. The Generate output of the first row is 00000000 in binary format as shown in FIG. 7.

Figure 8:
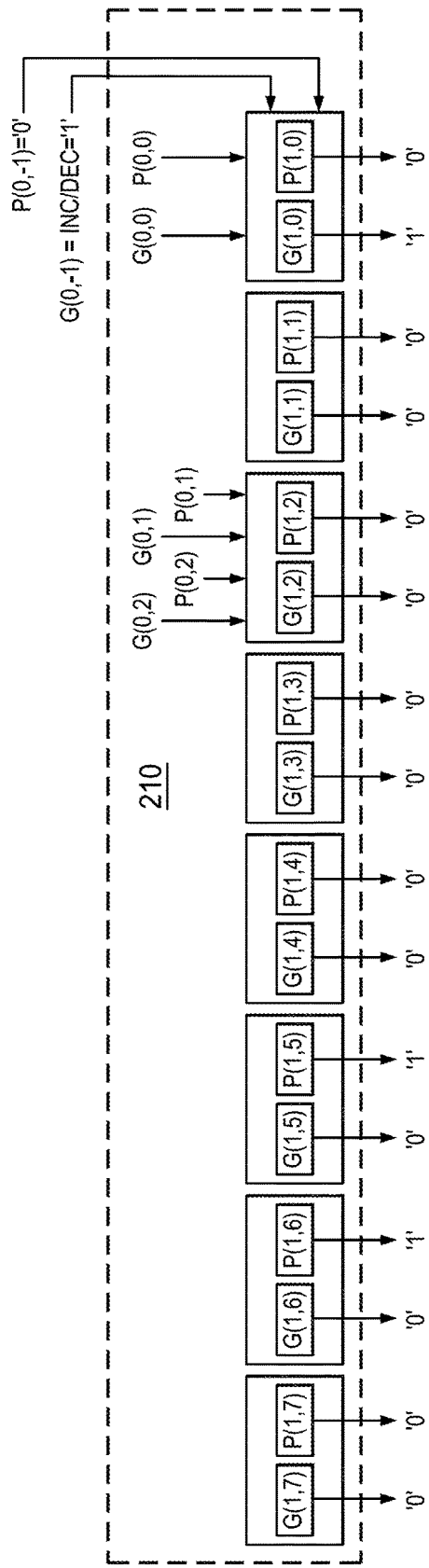
FIG. 8 illustrates a schematic diagram of a second row of the 8-bit increment/decrement apparatus shown in FIG. 6 in accordance with various embodiments of the present disclosure.

FIG. 8 illustrates a schematic diagram of a second row of the 8-bit increment/decrement apparatus shown in FIG. 6 in accordance with various embodiments of the present disclosure. Row 210 comprises eight Propagate and Generate cells. Each cell includes a Propagate output and a Generate output. Referring back to FIG. 4, each Propagate and Generate cell has two groups of inputs. The row index of row 210 is equal to 0. Referring back to Equation (2), the variable d of the row 210 is equal to 1. In other words, two groups of inputs are connected to a preceding cell in row 201 and a cell that is one cell away from the preceding cell.

For example, the cell of G(1,2) and P(1,2) has two groups of inputs. These two groups of inputs are connected to the outputs of the cell of P(0,2) and G(0,2) and the cell of P(0,1) and G(0,1) respectively. Furthermore, the cell of G(1,0) and P(1,0) has two groups of inputs. These two groups of inputs are connected to the outputs of the cell of P(0,0) and G(0,0) and the cell of P(0,−1) and G(0,−1) respectively. As shown in FIG. 8, G(0,−1) is equal to INC/DEC, which is 1. P(0,−1) is set to 0 as shown in FIG. 8.

The input signals of the eight Propagate and Generate cells in the row 210 are processed by the logic gates shown in FIG. 4. The Propagate output of the second row 210 is 01100000 in binary format as shown in FIG. 8. The Generate output of the second row 210 is 00000001 in binary format as shown in FIG. 8.

Figure 9:
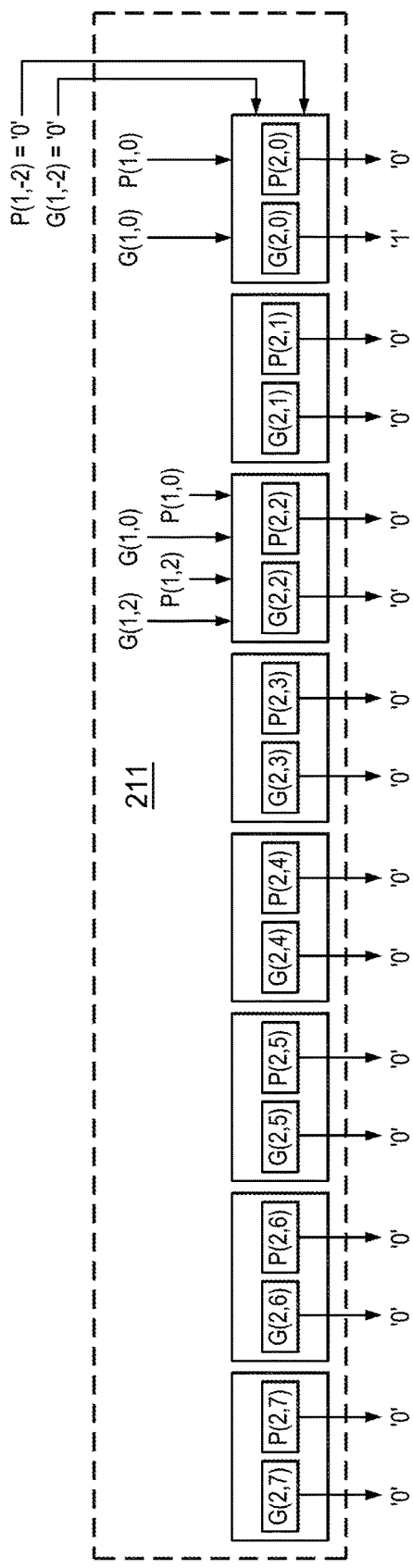
FIG. 9 illustrates a schematic diagram of a third row of the 8-bit increment/decrement apparatus shown in FIG. 6 in accordance with various embodiments of the present disclosure.

FIG. 9 illustrates a schematic diagram of a third row of the 8-bit increment/decrement apparatus shown in FIG. 6 in accordance with various embodiments of the present disclosure. Row 211 comprises eight Propagate and Generate cells. Each cell includes a Propagate output and a Generate output. Each cell has two groups of inputs. The row index of row 211 is equal to 1. Referring back to Equation (2), the variable d of the row 211 is equal to 2. In other words, two groups of inputs are connected to a preceding cell in row 210 and a cell that is two cells away from the preceding cell.

For example, the cell of G(2,2) and P(2,2) has two groups of inputs. These two groups of inputs are connected to the outputs of the cell of P(1,2) and G(1,2) and the cell of P(1,0) and G(1,0) respectively. Furthermore, as shown in FIG. 9, the cell of G(2,0) and P(2,0) has two groups of inputs. These two groups of inputs are connected to the outputs of the cell of P(1,0) and G(1,0) and the cell of P(1,−2) and G(1,−2) respectively. As shown in FIGS. 9, G(1,−2) and P(1,−2) is set to 0.

The input signals of the eight Propagate and Generate cells in the row 211 are processed by the logic gates shown in FIG. 4. The Propagate output of the second row 211 is 00000000 in binary format as shown in FIG. 9. The Generate output of the second row 211 is 00000001 in binary format as shown in FIG. 9.

Figure 10:
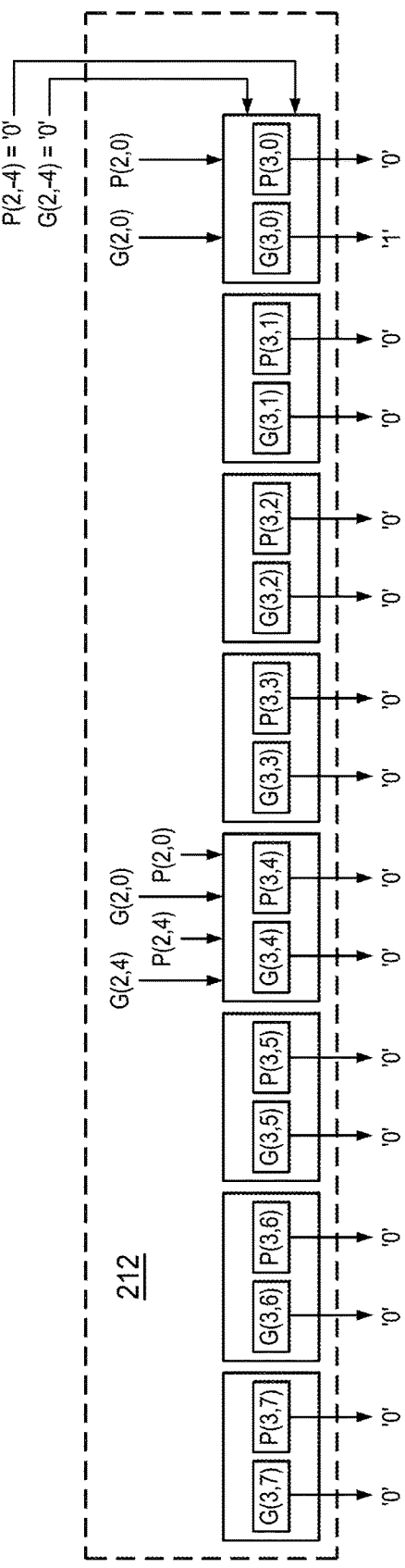
FIG. 10 illustrates a schematic diagram of a fourth row of the 8-bit increment/decrement apparatus shown in FIG. 6 in accordance with various embodiments of the present disclosure.

FIG. 10 illustrates a schematic diagram of a fourth row of the 8-bit increment/decrement apparatus shown in FIG. 6 in accordance with various embodiments of the present disclosure. Row 212 comprises eight Propagate and Generate cells. Each cell includes a Propagate output and a Generate output. Each cell has two groups of inputs. The row index of row 212 is equal to 2. Referring back to Equation (2), the variable d of the row 212 is equal to 4. In other words, two groups of inputs are connected to a preceding cell in row 211 and a cell that is four cells away from the preceding cell.

For example, the cell of G(3,4) and P(3,4) has two groups of inputs. These two groups of inputs are connected to the outputs of the cell of P(2,4) and G(2,4) and the cell of P(2,0)

and G(2,0) respectively. Furthermore, as shown in FIG. 10, the cell of G(3,0) and P(3,0) has two groups of inputs. These two groups of inputs are connected to the outputs of the cell of P(2,0) and G(2,0) and the cell of P(2,−4) and G(2,−4) respectively. As shown in FIG. 10, G(2,−4) and P(2,−4) is set to 0.

The input signals of the eight cells in the row 212 are processed by the logic gates shown in FIG. 4. The Propagate output of the second row 212 is 00000000 in binary format as shown in FIG. 10. The Generate output of the second row 212 is 00000001 in binary format as shown in FIG. 10.

Figure 11:
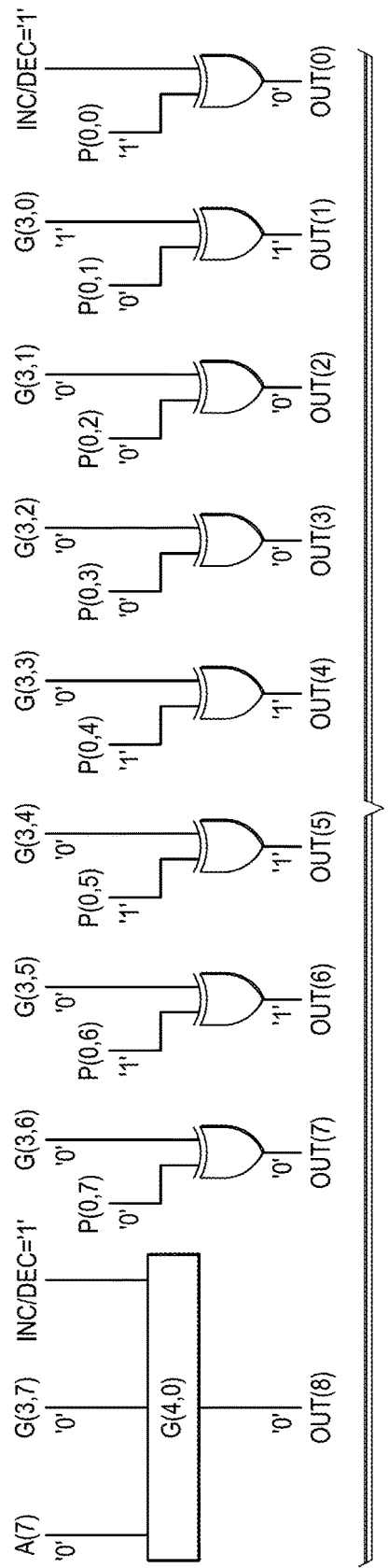
FIG. 11 illustrates a schematic diagram of an output block of the 8-bit increment/decrement apparatus shown in FIG. 6 in accordance with various embodiments of the present disclosure.

FIG. 11 illustrates a schematic diagram of an output block of the 8-bit increment/decrement apparatus shown in FIG. 6 in accordance with various embodiments of the present disclosure. The output block comprises eight exclusive OR (XOR) gates and the MSB unit G(4,0). As shown in FIG. 11, a first XOR gate has a first input connected to the control signal INC/DEC and a second input connected to P(0,0). The other XOR gates of the output block have a first input connected to an output of a Generate output of a preceding cell in row 213 and a second input connected to a corresponding Propagate output of the first row 201. For example, the second XOR gate has a first input connected to G(3,0) and a second input connected to P(0,1).

The Propagate output (from P(0,7) to P(0,0)) of the first row 201 is 01110001 in binary format as shown in FIG. 11. The Generate output (from G(3,7) to G(3,0)) of the fourth row 212 is 00000001 in binary format as shown in FIG. 11.

As shown in FIG. 11, the input signals are processed by the eight XOR gates. The XOR gates generate OUT(7)-OUT(0), which is 01110010 in binary format. A(7), G(3,7) and INC/DEC are processed by the logic gates shown in FIG. 5. The MSB unit G(4,0) generates OUT(8), which is equal to 0. The output of the output block generates a 9-bit number, which is 001110010 in binary format.

Figure 12:
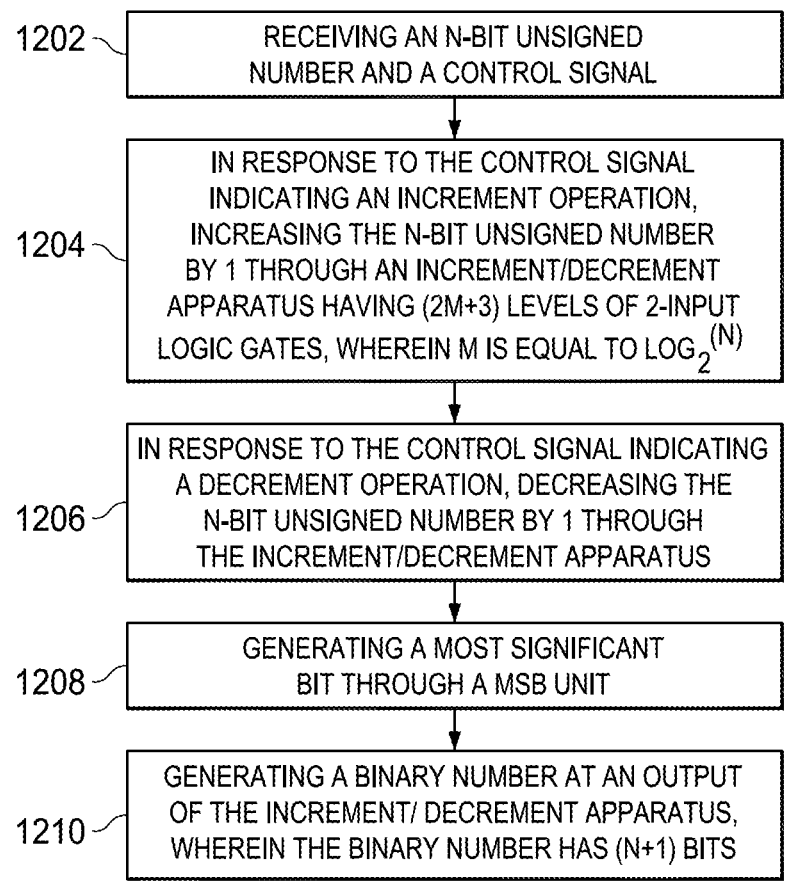
FIG. 12 illustrates a flow chart of an increment/decrement operation in accordance with various embodiments of the present disclosure.

FIG. 12 illustrates a flow chart of an increment/decrement operation in accordance with various embodiments of the present disclosure. At step 1202, receiving an N-bit unsigned number and a control signal. At step 1204, in response to the control signal indicating an increment operation, increasing the N-bit unsigned number by 1 through an increment/decrement apparatus having (2m+3) levels of 2-input logic gates, wherein m is equal to $\log_2^{(N)}$.

The increment/decrement apparatus comprises an input block configured to receive the N-bit unsigned number, wherein the input block comprises N propagate and generate cells, a plurality of calculation cells arranged in rows and columns, wherein the number of the columns is equal to N and the number of the rows is equal to m, wherein each row has an index ri, and wherein a variable d is equal to $2^{ri}$, and wherein each calculation cell has two groups of inputs connected to two cells in a preceding row, and wherein a first group of inputs are connected to outputs of a first calculation cell in the preceding row and vertically aligned with the calculation cell and a second group of inputs are connected to outputs of a second calculation cell that is d cells away from the first calculation cell and an output block comprising a plurality of XOR gates.

At step 1206, in response to the control signal indicating a decrement operation, decreasing the N-bit unsigned number by 1 through the increment/decrement apparatus. At step 1208, generating a most significant bit through a MSB unit. The MSB unit has a first input port configured to receive the control signal, a second input port configured to receive a high-order bit of the N-bit unsigned number and a third input port configured to receive a Generate output of a leftmost cell of a last row of the plurality of calculation cells. At step 1210, generating a binary number at an output of the increment/decrement apparatus, wherein the binary number has (N+1) bits.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
an input block configured to receive an N-bit unsigned number, wherein the input block comprises N propagate and generate cells;
a plurality of calculation cells arranged in rows and columns, wherein the number of the columns is equal to N and the number of the rows is equal to log2(N), wherein each row has an index ri, and wherein a variable d is equal to 2ri, and wherein each calculation cell has two groups of inputs connected to two cells in a preceding row, and wherein:
a first group of inputs are connected to outputs of a first calculation cell in the preceding row and vertically aligned with the calculation cell; and
a second group of inputs are connected to outputs of a second calculation cell that is d cells away from the first calculation cell; and
an output block comprising a plurality of XOR gates.

2. The apparatus of claim 1, wherein:
the propagate and generate cell comprises an NOT gate, an AND gate and a XNOR gate, wherein:
a first input of the AND gate is connected to a first input of the XNOR gate through the NOT gate; and
a second input of the AND gate is connected to a second input of the XNOR gate.

3. The apparatus of claim 2, wherein:
the first input of the XNOR gate is configured to receive a control signal; and
the second input of the XNOR gate is configured to receive a bit of the N-bit unsigned number.

4. The apparatus of claim 1, wherein the calculation cell comprises a first AND gate, a second AND gate and an OR gate, and wherein:
the first AND gate has a second input connected to a first input of the second AND gate; and
the OR gate has a first input connected to an output of the first AND gate.

5. The apparatus of claim 4, wherein:
a first input of the first AND gate is connected to a Generate output of the second calculation cell;
the second input of the first AND gate is connected to a Propagate output of the first calculation cell;

a second input of the second AND gate is connected to a Propagate output of the second calculation cell; and a second input of the OR gate is connected to a Generate output of the first calculation cell.

6. The apparatus of claim 4, wherein:

an output of the OR gate is configured to generate a Generate output signal; and an output of the second AND gate is configured to generate a Propagate output signal.

7. The apparatus of claim 1, further comprising:

a most significant bit (MSB) unit having a first NOT gate, a second NOT gate, a third NOT gate, a first NAND gate, a second NAND gate and a third NAND gate, wherein:

the third NAND gate has a first input connected to an output of the first NAND gate; and the third NAND gate has a second input connected to an output of the second NAND gate.

8. The apparatus of claim 7, wherein:

the MSB unit has a first input port configured to receive a control signal, a second input port configured to receive a high-order bit of the N-bit unsigned number and a third input port configured to receive a Generate output of a leftmost cell of a last row of the plurality of calculation cells.

9. The apparatus of claim 8, wherein:

the first NAND gate has a first input coupled to the first input port through the first NOT gate, a second input coupled to the second input port through the second NOT gate and a third input coupled to the third input port; and the second NAND gate has a first input coupled to the third input port through the third NOT gate, a second input coupled to the first input port and a third input connected to the second input of the first NAND gate.

10. The apparatus of claim 1, wherein:

the output block is configured to generate an (N+1)-bit number.

11. A system comprising:

an input block configured to receive an N-bit unsigned number and a control signal, wherein the input block comprises N propagate and generate cells;

a plurality of calculation cells arranged in rows and columns and coupled to the input block, wherein the calculation cells are configured to perform an increment/decrement operation, the increment/decrement operation is applied to the N-bit unsigned number through (2m+3) levels of 2-input logic gates, wherein m is equal to log2(N); and an output block comprising a plurality of XOR gates coupled to a last row of the plurality of calculation cells.

12. The system of claim 11, wherein:

the number of the columns is equal to N; and the number of the rows is equal to $\log_2(N)$.

13. The system of claim 11, wherein:

each row has an index ri, and wherein a variable d is equal to 2ri, and wherein each calculation cell has two groups of inputs connected to two cells in a preceding row, and wherein:

a first group of inputs are connected to outputs of a first calculation cell in the preceding row and vertically aligned with the calculation cell; and a second group of inputs are connected to outputs of a second calculation cell that is d cells away from the first calculation cell.

14. The system of claim 11, wherein:

the calculation cells are configured to perform an increment operation in response to the control signal indicating 1; and the calculation cells are configured to perform a decrement operation in response to the control signal indicating 0.

15. A method comprising:

receiving an N-bit unsigned number and a control signal by an increment/decrement apparatus comprising an input block having N cells, a plurality of calculation cells connected to outputs of the input block, and an output block having a plurality of gates connected to outputs of the plurality of calculation cells;

in response to the control signal indicating an increment operation, increasing the N-bit unsigned number by 1 through the increment/decrement apparatus having (2m+3) levels of 2-input logic gates, wherein m is equal to log2(N); and in response to the control signal indicating a decrement operation, decreasing the N-bit unsigned number by 1 through the increment/decrement apparatus.

16. The method of claim 15, wherein the increment/decrement apparatus comprises:

the input block configured to receive the N-bit unsigned number, wherein the input block comprises N propagate and generate cells;

the plurality of calculation cells arranged in rows and columns, wherein the number of the columns is equal to N and the number of the rows is equal to m, wherein each row has an index ri, and wherein a variable d is equal to 2ri, and wherein each calculation cell has two groups of inputs connected to two cells in a preceding row, and wherein:

a first group of inputs are connected to outputs of a first calculation cell in the preceding row and vertically aligned with the calculation cell; and a second group of inputs are connected to outputs of a second calculation cell that is d cells away from the first calculation cell; and the output block comprising a plurality of XOR gates.

17. The method of claim 16, wherein:

the propagate and generate cell comprises an NOT gate, an AND gate and a XNOR gate, wherein:

a first input of the AND gate is connected to a first input of the XNOR gate through the NOT gate;

a second input of the AND gate is connected to a second input of the XNOR gate;

the first input of the XNOR gate is configured to receive the control signal; and the second input of the XNOR gate is configured to receive a bit of the N-bit unsigned number.

18. The method of claim 16, further comprising:

generating a most significant bit through a MSB unit.

19. The method of claim 18, wherein:

the MSB unit has a first input port configured to receive the control signal, a second input port configured to receive a high-order bit of the N-bit unsigned number and a third input port configured to receive a Generate output of a leftmost cell of a last row of the plurality of calculation cells.

20. The method of claim 15, further comprising:

generating a binary number at an output of the increment/decrement apparatus, wherein the binary number has (N+1) bits.

* * * * *

UNITED STATES PATENT AND TRADEMARK OFFICE
CERTIFICATE OF CORRECTION

| | | |
|---|---|---|
| PATENT NO. | : 9,785,405 B2 | Page 1 of 1 |
| APPLICATION NO. | : 14/726167 | |
| DATED | : October 10, 2017 | |
| INVENTOR(S) | : Huong Ho | |

It is certified that error appears in the above-identified patent and that said Letters Patent is hereby corrected as shown below:

On the Title Page

Item (71) Applicant, Line 2, delete "Shenzhen, CA (US)" and insert --Shenzhen (CN)--.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*